United States Patent
Tanaka (10) Patent No.: US 10,306,210 B2
(45) Date of Patent: May 28, 2019

(54) IMAGE PROCESSING APPARATUS AND IMAGE CAPTURING APPARATUS

(71) Applicant: CANON KABUSHIKI KAISHA, Tokyo (JP)

(72) Inventor: Shin Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 14/525,045

(22) Filed: Oct. 27, 2014

(65) Prior Publication Data

US 2015/0116464 A1  Apr. 30, 2015

(30) Foreign Application Priority Data

Oct. 29, 2013 (JP) .................................. 2013-224443

(51) Int. Cl.
| | |
|---|---|
| H04N 15/00 | (2006.01) |
| H04N 13/271 | (2018.01) |
| G06T 5/00 | (2006.01) |
| H04N 13/106 | (2018.01) |
| H04N 13/128 | (2018.01) |

(52) U.S. Cl.
CPC ........... *H04N 13/271* (2018.05); *G06T 5/002* (2013.01); *H04N 13/106* (2018.05); *G06T 2207/10028* (2013.01); *H04N 13/128* (2018.05); *H04N 2213/003* (2013.01)

(58) Field of Classification Search
CPC ..................... H04N 13/0022; H04N 2213/003
USPC .......................................................... 348/49
See application file for complete search history.

(56) References Cited

U.S. PATENT DOCUMENTS

| 7,889,949 B2* | 2/2011 | Cohen ................... G06T 3/4007 382/299 |
| 2010/0080484 A1* | 4/2010 | Shimodaira ............. G06T 5/002 382/264 |
| 2011/0193860 A1* | 8/2011 | Lee ....................... H04N 13/026 345/419 |
| 2012/0082368 A1* | 4/2012 | Hirai ...................... G06T 5/002 382/154 |

(Continued)

FOREIGN PATENT DOCUMENTS

| JP | H11250240 A | 9/1999 |
| JP | 2000-339498 A | 12/2000 |

(Continued)

OTHER PUBLICATIONS

Garcia et al. "Pixel weighted average strategy for depth sensor data fusion." Image Processing (ICIP), 2010 17th IEEE International Conference on. IEEE, (Year: 2010).*

(Continued)

*Primary Examiner* — Tat C Chio
*Assistant Examiner* — Fabio S Lima
(74) *Attorney, Agent, or Firm* — Canon U.S.A., Inc. IP Division (57) ABSTRACT

An image processing apparatus includes: an acquisition unit configured to acquire captured image data and depth map data representing a distribution of depth information of an object acquired from the captured image data; a reduction unit configured to reduce the captured image data acquired by the acquisition unit in accordance with a data amount of the depth map data; and a correction unit configured to correct the depth map data by using the reduced captured image data.

10 Claims, 6 Drawing Sheets

(56) References Cited

U.S. PATENT DOCUMENTS

| | | | | |
|---|---|---|---|---|
| 2012/0121163 | A1* | 5/2012 | Zhang | H04N 5/144 382/154 |
| 2012/0163701 | A1* | 6/2012 | Gomi | H04N 13/026 382/154 |
| 2013/0088614 | A1* | 4/2013 | Lee | G06T 5/002 348/223.1 |
| 2013/0113962 | A1* | 5/2013 | Li | G06T 5/50 348/240.2 |
| 2013/0215107 | A1* | 8/2013 | Kimura | G06T 15/00 345/419 |
| 2013/0308005 | A1* | 11/2013 | Takahashi | G06T 5/003 348/222.1 |
| 2013/0342641 | A1* | 12/2013 | Morioka | G03B 35/08 348/36 |
| 2014/0043335 | A1* | 2/2014 | Kobayashi | H04N 13/0022 345/427 |
| 2014/0093159 | A1* | 4/2014 | Nguyen | G06T 5/002 382/154 |
| 2014/0333739 | A1* | 11/2014 | Yang | H04N 13/0011 348/54 |

FOREIGN PATENT DOCUMENTS

| | | |
|---|---|---|
| JP | 2001-194576 A | 7/2001 |
| JP | 2010079780 A | 4/2010 |
| JP | 2012-078942 A | 4/2012 |
| JP | 2012078942 A | 4/2012 |
| JP | 2012138787 A | 7/2012 |
| JP | 2014-009975 A | 1/2014 |
| WO | 2013145554 A1 | 10/2013 |

OTHER PUBLICATIONS

Takenaka, Wada, Oike, Inoue, and Shimada, Bilateral Filtering based depth image correction consistent with color image captured by Kinect, Technical Report of IEICE, vol. 112, No. 385, PRMU2012-119, pp. 311-316, Jan. 2013.

* cited by examiner

IMAGE PROCESSING APPARATUS AND IMAGE CAPTURING APPARATUS

BACKGROUND OF THE INVENTION

Field of the Invention

The present invention relates to an image processing apparatus and an image capturing apparatus.

Description of the Related Art

There has been proposed a technique for acquiring or calculating a captured image and a depth map representing a distribution of depth information from the captured image. A three-dimensional image is generated by using the depth map. However, because the acquired depth information often contains an error, there has been proposed a technique for correcting depth information of each pixel in the depth map. In Japanese Patent Laid-Open No. 2012-78942, clustering is performed by using pixel values and depth values of a plurality of pixels in a calculation range of a correction target pixel, a depth value of the correction target pixel is calculated on the basis of the clustering result, and thus depth information of each pixel is corrected. In addition, in Haruka Takenaka and four other authors, "Bilateral Filtering based depth image correction consistent with color image captured by Kinect", Technical Report of IEICE, vol. 112, no. 385, PRMU2012-119, pp. 311-316, January 2013, a weight representing an index of the possibility of having a similar depth is decided upon by using a distance between a correction target pixel and its surrounding pixel, a distance between a pixel value of the correction target pixel and a pixel value of the surrounding pixel, and information on reliability of calculated depth information, and a weighted smoothing process is performed so as to correct depth information.

In Japanese Patent Laid-Open No. 2012-78942, and in Haruka Takenaka and four other authors, "Bilateral Filtering based depth image correction consistent with color image captured by Kinect", Technical Report of IEICE, vol. 112, no. 385, PRMU2012-119, pp. 311-316, January 2013, depth information of a target pixel is corrected by using depth information or the like of pixels surrounding the target pixel. In order to accurately correct depth information, correction using a wide range of surrounding pixels is required, thereby increasing the amount of calculation.

SUMMARY OF THE INVENTION

The present invention provides an image processing apparatus that accurately corrects depth information with a small amount of calculation.

An image processing apparatus according to an aspect of the present invention includes: an acquisition unit configured to acquire captured image data and depth map data representing a distribution of depth information of an object acquired from the captured image data; a reduction unit configured to reduce the captured image data acquired by the acquisition unit in accordance with a data amount of the depth map data; and a correction unit configured to correct the depth map data by using the reduced captured image data.

An image processing apparatus according to another aspect of the present invention includes: an acquisition unit configured to acquire captured image data and depth map data representing a distribution of depth information of an object acquired from the captured image data; a reduction unit configured to reduce the captured image data acquired by the acquisition unit and the depth map data acquired by the acquisition unit; and a correction unit configured to correct the reduced depth map data by using the reduced captured image data.

An image processing apparatus according to another aspect of the present invention includes: an acquisition unit configured to acquire captured image data and depth map data representing a distribution of depth information of an object acquired from the captured image data; and a correction unit configured to correct the depth map data by using luminance values of pixels in the captured image data respectively corresponding to pixels in the depth map data, wherein a total number of pixels in the captured image data used when the depth map data is corrected is less than a number of all pixels in the captured image data.

Further features of the present invention will become apparent from the following description of exemplary embodiments with reference to the attached drawings.

DESCRIPTION OF THE EMBODIMENTS

Depth information in the present invention may refer to a relative distance from a mid-point position between focus positions of two images to an object, a relative distance from a focus position of one of the images to the object, or an absolute distance from an image capturing apparatus at the time of capturing an image to the object. Besides, an absolute distance or a relative distance may be either a distance on an image plane side or a distance on an object side. Furthermore, a distance may be represented by a real-space distance or a defocus amount.

The present invention will be described in detail using embodiments and the drawings; however, the present invention is not limited to the configuration of each embodiment. Furthermore, the embodiments may be appropriately combined.

First Embodiment

Figure 1:
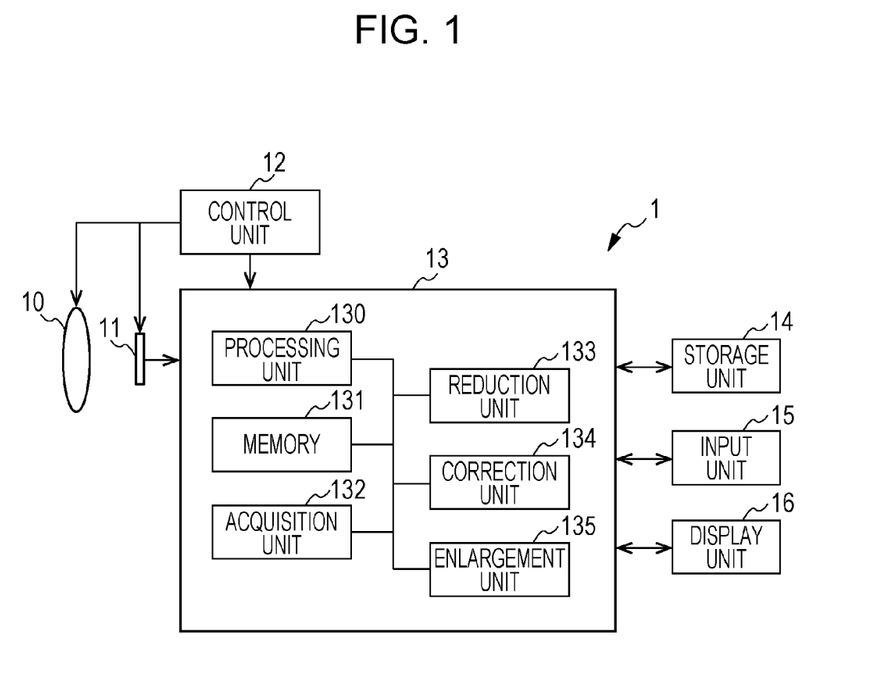
FIG. 1 is a schematic diagram illustrating an example of an image capturing apparatus including an image processing apparatus according to a first embodiment.

FIG. 1 schematically illustrates the configuration of an image capturing apparatus according to a first embodiment of the present invention. An image capturing apparatus 1 includes an image capturing optical system 10, an image sensor 11, a control unit 12, an image processing apparatus 13, a storage unit 14, an input unit 15, and a display unit 16.

The image capturing optical system 10 is an optical system that is constituted by a plurality of lenses and forms an image with incident light on an image plane of the image sensor 11. The image sensor 11 is a charge coupled device (CCD) or complementary metal oxide semiconductor (CMOS) image sensor. The image sensor 11 may be an image sensor having a color filter, a monochromatic image sensor, or a 3-CCD image sensor.

The image processing apparatus 13 includes a processing unit 130, a memory 131, an acquisition unit 132, a reduction unit 133, a correction unit 134, and an enlargement unit 135. The processing unit 130 has a function of performing various signal processes, such as analog-to-digital (AD) conversion of an analog signal output from the image sensor 11, noise removal, demosaicing, luminance signal conversion, aberration correction, white balance adjustment, and color correction. Digital image data output from the processing unit 130 is accumulated in the memory 131, and is used for display on the display unit 16, recording (retention) in the storage unit 14, calculation of depth information, generation of depth map data, and so forth. The depth map data represents a distribution of depth information and may be or does not have to be in an image data format.

The acquisition unit 132 acquires captured image data from a signal output from the processing unit 130, and acquires, from the captured image data, depth information of an object and depth map data. As methods for acquiring depth information of the object, there are a method (depth from defocus (DFD) method) using pieces of differently out-of-focus captured image data captured on different image capturing conditions, and a method (stereo method) using pieces of captured image data with a different parallax. In addition, there are a time of flight method and a depth from focus method. The depth map data acquired by the acquisition unit 132 is stored in the storage unit 14, or temporarily stored in the memory 131, and is used for a subsequent process.

The reduction unit 133 has a function of reducing image data. The term "reduction" refers to reducing a data amount of image data so as to reduce the resolution of an image. In a specific reduction method, if resolution is reduced by half, half data may be uniformly extracted from all data in image data so as to generate new image data. In addition, there is a method in which a plurality of pieces of data among all pieces of data in image data are subjected to weighted averaging so as to be a single piece of data, thereby reducing the resolution of the image data.

The reduction unit 133 reduces the captured image data such that the captured image data has the same data amount as that of the depth map data acquired by the acquisition unit 132. In this embodiment, as captured image data, color image data is generated from RGGB channels in a Bayer array in the image sensor 11 through interpolation. Depth map data is generated by using only one G channel of the RGGB channels before interpolation, and its resolution (data amount) is therefore smaller than that of the captured image data. Because of this, for a subsequent process, a data amount of the captured image data and a data amount of the depth map data are made to coincide with each other.

The correction unit 134 has a function of correcting, by using the image data reduced by the reduction unit 133 and the depth map data, depth information of each pixel in the depth map data. A correction method will be described later.

The enlargement unit 135 has a function of enlarging the depth map data corrected by the correction unit 134. The term "enlargement" is the opposite of reduction and refers to increasing a data amount of image data so as to increase the resolution of an image. The enlargement unit 135 enlarges the depth map data corrected by the correction unit 134 such that the depth map data has the same data amount as that of the original captured image data. In this enlargement process, a data amount of the original captured image data and a data amount of the corrected depth map data are made to coincide with each other because the depth map data is required for a subsequent process.

The storage unit 14 is a non-volatile storage medium in which captured image data, depth map data, parameter data used in the image capturing apparatus 1, and so forth are stored. As the storage unit 14, any storage medium may be used as long as it is capable of reading/writing at high speed and also is a large-capacity storage medium. For example, a flash memory or the like is desirable. The input unit 15 is an interface which is operated by a user and via which information input and a change of settings are performed on the image capturing apparatus 1. For example, a dial, a button, a switch, a touch panel, and the like may be used. The display unit 16 is a display unit constituted by a liquid crystal display, an organic electroluminescence (EL) display, or the like. The display unit 16 is used for checking composition at the time of capturing an image, viewing captured/recorded images, displaying various settings screens or message information, and so forth.

The control unit 12 has a function of controlling each component of the image capturing apparatus 1. Examples of the function of the control unit 12 include automatic focus adjustment using auto focus (AF), a change of a focus position, a change of an F-number (aperture), image capturing, control of a shutter and a flash (which are not illustrated), and control of the storage unit 14, input unit 15, and display unit 16.

Next, errors appearing on depth map data will be described. A first error is an error (data loss) in which depth information is not able to be acquired. A cause of this error differs among methods for acquiring a depth. Taking a stereo method as an example, this error occurs due to, on an object field side, a portion without any pattern (texture), a portion of a dark area, an area (occlusion area) which is not seen from one side due to a difference in parallax, or the like. Furthermore, such portions often occur in pieces of depth information corresponding to a plurality of successive pixels.

A second error is an error occurring in a portion (referred to as a depth boundary portion) in which depth information varies significantly. When there are objects on the front side and the back side, respectively, this error appears in a portion in which the objects overlap each other. In the case where a method of calculating a depth by using a degree of similarity between images, such as a DFD method, is used, respective pieces of information of the front side and the back side are mixed in a depth boundary portion upon calculation of a depth, thus resulting in a large error between pieces of calculated depth information.

A third error is an error occurring due to occurrence of noise in depth information. This is an error in which, when there is an object at the same depth, pieces of depth information within the object vary for some reason.

Figure 2:
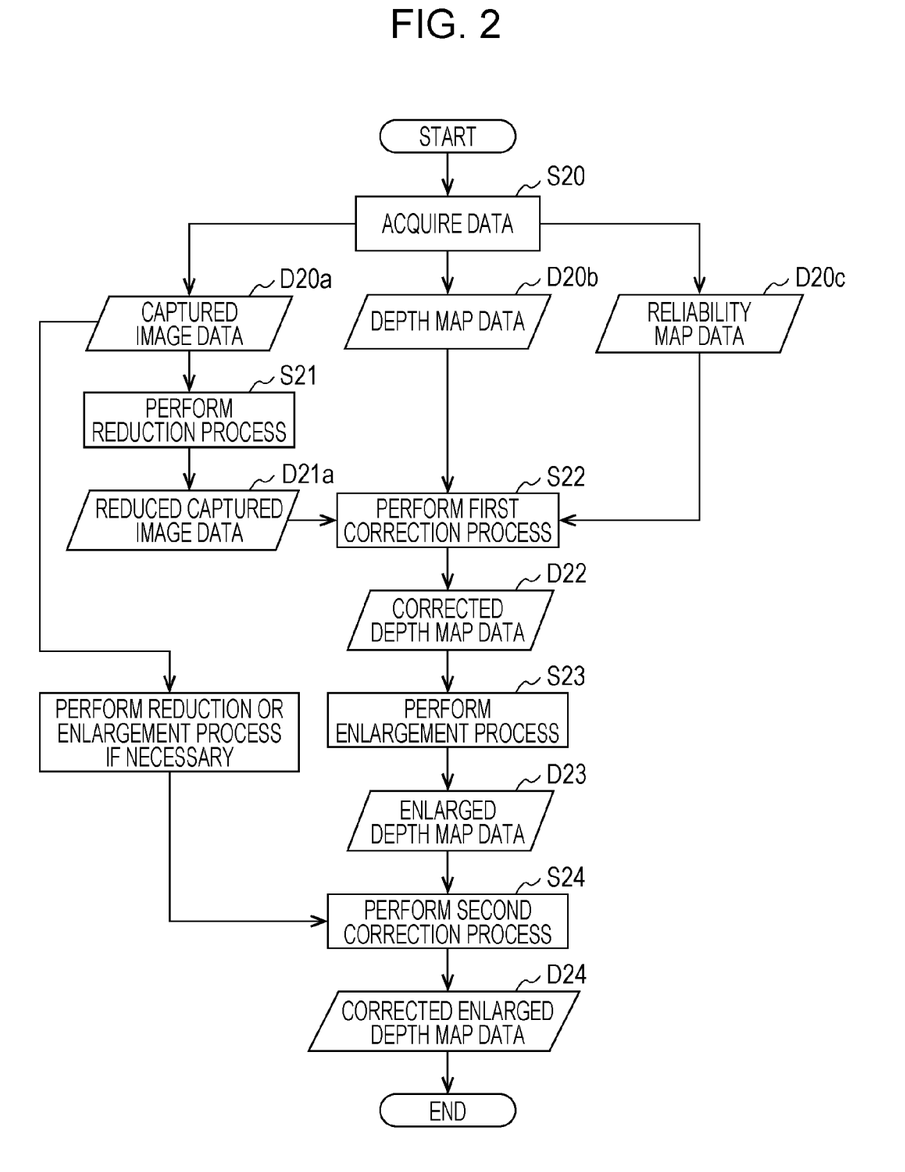
FIG. 2 illustrates an example of a flowchart of an image processing method in the first embodiment.

In light of the above-mentioned errors, an image processing method for correcting them will be described together with an image processing method according to this embodiment with reference to a flowchart in FIG. 2.

First, the acquisition unit 132 acquires captured image data D20a, depth map data D20b, and reliability map data D20c (S20). The reliability map data D20c represents a distribution of reliability of depth information of each pixel in the depth map data D20b. As for depth information, if there is a high possibility that any of the above-mentioned errors has occurred, a value of the reliability is low. Furthermore, the reliability map data does not have to be retained in an image data format. The reliability map data may be a data group in which a correspondence relationship between each pixel of the depth map data and each pixel of the captured image data is established.

Subsequently, the reduction unit 133 performs a reduction process on the captured image data D20a (S21). As a method for deciding upon a reduction ratio, for example, there is a method in which a decision is made on the basis of the size of a data loss area. This is because an amount by which an interpolation is performed on the data loss area is decided upon in accordance with a correction process, which will be described, to be performed on the depth map data D20b and the reduction ratio. For some use purposes of finally generated depth map data, an interpolation does not necessarily have to be performed on the entire data loss area.

Furthermore, the reduction unit 133 reduces the original captured image data D20a such that a data amount of reduced captured image data D21a is the same as that of the depth map data D20b.

Subsequently, the correction unit 134 performs a correction process on the depth map data D20b by using the captured image data D21a reduced in S21 and the reliability map data D20c (S22). As an example of the correction process, a filtering process using the following formula 1 is provided.

$$D'(p) = \frac{\sum_{q \in S} G_{\sigma_s}(|p-q|) G_{\sigma_r}(|I(p)-I(q)|) T(c(q)) D(q)}{\sum_{q \in S} G_{\sigma_s}(|p-q|) G_{\sigma_r}(|I(p)-I(q)|) T(c(q))} \quad \text{formula 1}$$

In the formula 1, D denotes depth information before correction, and D' denotes depth information after correction. I denotes a luminance value (color) of a pixel in the reduced captured image data. The symbol p denotes a position of a correction target pixel in the depth map data, and q denotes a position of a surrounding pixel surrounding a correction target pixel p. G denotes a Gaussian function ($\sigma$ is a variance value), and $G_{\sigma_s}$ and $G_{\sigma_r}$ may be different Gaussian functions or the same Gaussian function. S denotes a calculation range, and when S is large, the number of surrounding pixels q's is also large. The symbol c represents reliability. If the reliability of the depth information is high, T is set to 1, and if the reliability of the depth information is low, T is set to 0. For example, if c is within a value range from 0 to 1 inclusive, when c is 0.5 or more, T is set to 1, and when c is less than 0.5, T is set to 0. Besides, if c is assumed to take only two values of 0 and 1, T(c) may be replaced with c.

The filtering process using the formula 1 is to perform a weighted averaging process using only depth information, a luminance value (color) of a pixel in the reduced captured image data corresponding to which before correction is close to a luminance value of its surrounding pixel, and also whose reliability is high. That is, first, an interpolation of data loss is performed by using the reliability map data. Then, a luminance value (color) of a pixel which is close to that of a correction target pixel is used owing to the introduction of the Gaussian function $G_{\sigma_r}$, and a depth boundary portion is thereby accurately corrected. Furthermore, noise is removed through an averaging process. In this filtering process method, data of the correction target pixel and data of its surrounding pixel are compared, and a weight is decided upon. What the range of surrounding pixels whose data is to be subjected to a comparison calculation is affects the amount of calculation, and the amount of correction performed on data loss and a depth boundary portion. Because of this, a weight has to be appropriately decided upon. Since the reduction process has been performed in S21, the range of an error, such as data loss, is smaller than that in the case where the reduction process has not been performed, and the range of surrounding pixels used for the calculation may be reduced, thereby reducing the amount of calculation. The calculation is performed on the entire depth map data, and the depth map data D20b is thereby corrected.

Subsequently, the enlargement unit 135 performs an enlargement process on depth map data D22 subjected to the correction process (S23). As an interpolation method due to the enlargement process, there is a nearest neighbor method, a bilinear method, and a bicubic method; however, the method is not limited to them, and any method may be used. It is desirable to set an enlargement ratio such that a data amount of enlarged depth map data D23 is the same as that of the original captured image data D20a because the highest-resolution depth map data D23 is obtained. If more enlargement is performed, for a subsequent step, the original captured image data D20a also has to be enlarged, and depth accuracy in a depth boundary portion decreases due to the influence of the data interpolation due to enlargement. In addition, the data amount of the enlarged depth map data D23 may be a data amount between the data amount of the original captured image data D20a and the data amount of the reduced captured image data. In this case, for a subsequent step, the reduction unit 133 may reduce the original captured image data D20a such that the data amount of the original captured image data D20a is the same as that of the enlarged depth map data D23.

Finally, the correction unit 134 performs a correction process on the enlarged depth map data D23 by using the original captured image data D20a, or the reduced or enlarged captured image data (S24), and final depth map data D24 is generated. This is because an error between pieces of depth information which occurs due to an interpolation process performed in a depth boundary portion in the depth map data D23 due to the enlargement process in S23 is corrected. Specifically, the correction process is performed by using the following formula 2.

$$D'(p) = \frac{\sum_{q \in S'} G_{\sigma_s}(|p-q|) G_{\sigma_r}(|I(p)-I(q)|) D(q)}{\sum_{q \in S'} G_{\sigma_s}(|p-q|) G_{\sigma_r}(|I(p)-I(q)|)} \quad \text{formula 2}$$

The formula 2 is a formula in which the factor T related to reliability is removed from the formula 1. This is because reliability does not have to be used again because lost information has already been corrected. If lost depth information is not still corrected enough in S22, correction may be performed again by using this process in consideration of reliability. In this case, reliability information corresponding to the data amount of the depth map data D23 subjected to the enlargement process in S23 is prepared, and a process using the formula 1 is performed in the same way.

As in the correction process in S22, a calculation range S' in this correction process in S24 affects the amount of calculation, and the amount of correction performed on data loss and a depth boundary portion. In particular, when data loss or a depth boundary portion has already been corrected in the correction process in S22, the calculation range may be decided upon in accordance with an error in a depth boundary portion due to the enlargement process. In this case, the calculation range S' is smaller than the calculation range S in the correction process in S22.

Next, there will be described a reduction ratio of the captured image data D20a in the reduction process in S21, the calculation range S in the correction process in S22, an enlargement ratio of the depth map data D22 in the enlargement process in S23, and the calculation range S' in the correction process in S24.

As described above, the calculation range S in the correction process in S22 is decided upon in accordance with the amount of correction performed on data loss and a depth boundary portion. For example, it is assumed that N denotes a data amount, required for correction of data loss and a depth boundary portion, of the captured image data D20a before the reduction process, and that C denotes a reduction ratio. Because the depth map data D20b and the reduced captured image data D21a have the same data amount, a data amount N' required in the correction process in S22 is represented by the following formula 3, where N is multiplied by the reduction ratio C, and N' is smaller than N.

$$N'=CN \quad \text{formula 3}$$

An enlargement ratio U in the enlargement process in S23 is decided upon in accordance with what data amount of the enlarged depth map data D23 is to be set. For example, if the data amount is made to coincide with the data amount of the original captured image data D20a, the following formula 4 is provided.

$$U=1/C \quad \text{formula 4}$$

Furthermore, in order to correct an error in a depth boundary portion which has occurred due to the enlargement process in S23, a calculation range (filter size) L in the correction process in S24 is defined by the following.

$$L \geq 2U \quad \text{formula 5}$$

Next, the amount of calculation will be described. The amount of calculation in steps in this embodiment is almost proportional to the product of the number of pieces of data to be calculated and a calculation range. A calculation amount P in the above-mentioned flow is represented by the following formula 6, where H denotes the number of horizontal pixels of the original captured image data and V denotes the number of vertical pixels of it.

$$P \propto (N^2 C^2 HV + L^2 U^2 C^2 HV) \quad \text{formula 6}$$

The first term of the formula 6 represents the amount of calculation in the correction process in S22, and the second term represents the amount of calculation in the correction process in S24. In order to acquire depth map data comparable in accuracy to that in this embodiment without reducing the original captured image data D20a, a calculation amount $P_n$ involved in the case where a correction process is performed on data loss and a depth boundary portion is represented by the following formula 7.

$$P_n \propto N^2 HV \quad \text{formula 7}$$

From the formulas 3, 6, and 7, when the following formula 8 is satisfied by the calculation range L, the reduction ratio C, and the enlargement ratio U, an effect of a reduction in the amount of calculation is achieved.

$$L^2 < N^2(1-C^4)/U^2 C^2 \quad \text{formula 8}$$

The effect will be discussed using specific numerical values. Assuming that N is 120, if the reduction ratio C is 0.5 and the enlargement ratio U is 2, N' is 60 from the formula 3, and L is 4 at minimum from the formula 5. In this case, from the formulas 6 and 7, the calculation amount P may be reduced to about one sixteenth with respect to $P_n$.

According to this embodiment, accurate depth map data may be acquired with a small amount of calculation.

Second Embodiment

Figure 3:
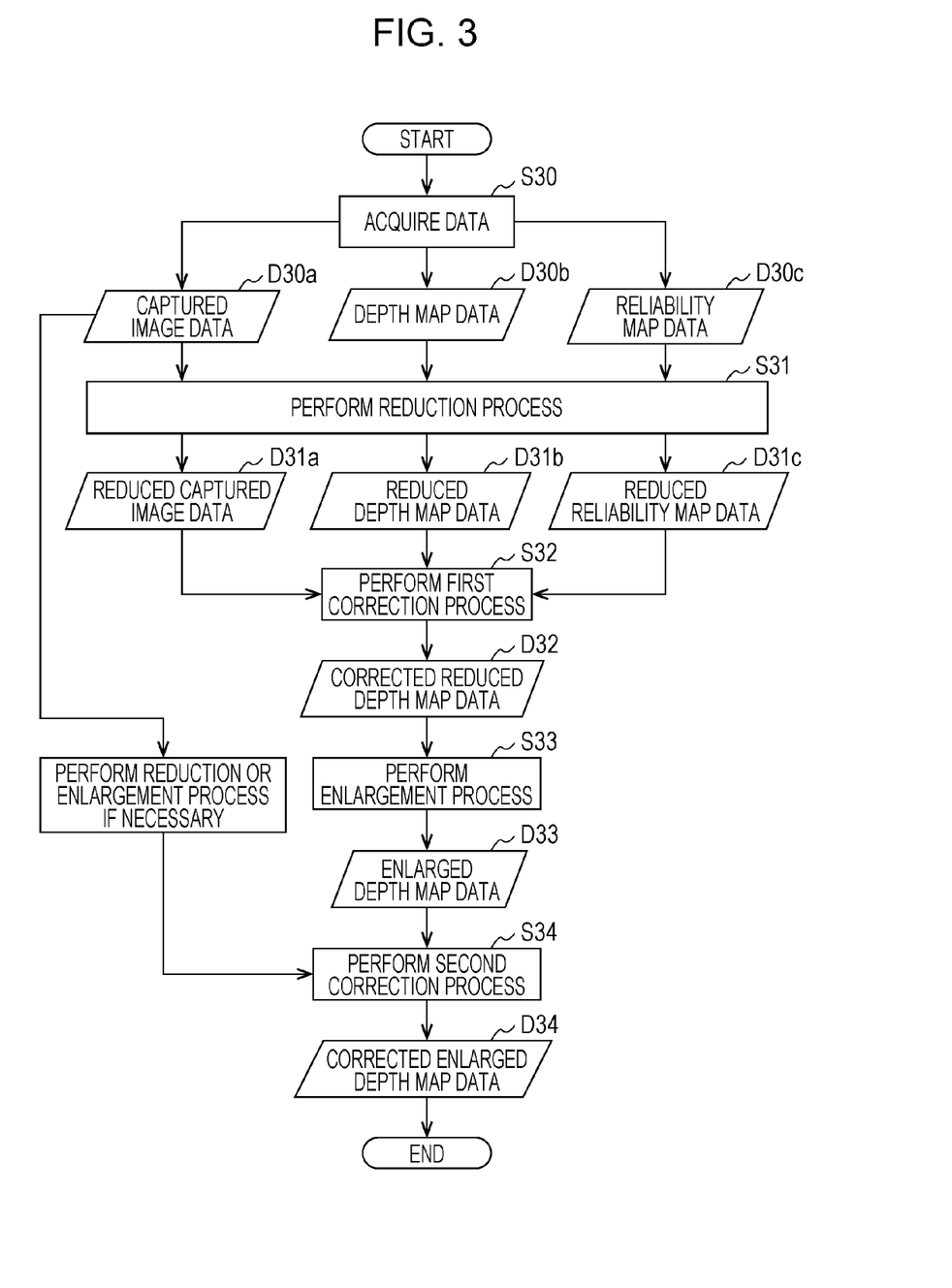
FIG. 3 illustrates an example of a flowchart of an image processing method in a second embodiment.

In the first embodiment, a reduction process is performed such that image data has the same data amount as that of depth map data. On the other hand, this embodiment differs from the first embodiment in that a process of reducing image data, depth map data, and also reliability map data is performed. That is, in this embodiment, image data is reduced such that a data amount thereof coincides with a data amount of reduced depth map data instead of being reduced such that the data amount thereof coincides with a data amount of depth map data. FIG. 3 illustrates an example of a flowchart of an image processing method according to this embodiment. The image processing method according to this embodiment will be described with emphasis on differences from the first embodiment with reference to FIG. 3. Besides, an image processing apparatus according to this embodiment is the same as that according to the first embodiment.

First, the acquisition unit 132 acquires captured image data D30a, depth map data D30b, and reliability map data D30c (S30). In this embodiment, a data amount of the captured image data D30a and a data amount of the depth map data D30b may be different from each other, or alternatively, may be the same.

Subsequently, the reduction unit 133 performs a reduction process on the captured image data D30a, the depth map data D30b, and the reliability map data D30c (S31). The captured image data D30a, the depth map data D30b, and the reliability map data D30c are reduced such that respective data amounts of reduced captured image data D31a, reduced depth map data D31b, and reduced reliability map data D31c are the same.

Then, the correction unit 134 performs a correction process on the reduced depth map data D31b by using the reduced captured image data D31a and the reduced reliability map data D31c (S32). In the correction process, a method similar to that in the first embodiment may be adopted. As a result, corrected depth map data D32 is generated.

Subsequently, the enlargement unit 135 performs an enlargement process on the depth map data D32 subjected to the correction process (S33), and generates enlarged depth map data D33. Finally, the correction unit 134 performs a correction process on the enlarged depth map data D33 by using the captured image data D30a, or reduced or enlarged captured image data (S34), and final depth map data D34 is generated. In the enlargement process (S33) and the correction process (S34), methods similar to those in the first embodiment may be applied.

In this embodiment as well, when the formula 8 in the first embodiment is satisfied, the amount of calculation may be reduced and highly-accurate depth map data may be acquired. Note that a reduction ratio is not limited in this embodiment. The amount of overall calculation is reduced to a certain extent as the reduction ratio increases. In this case, however, a calculation range in the correction process in S34 increases so as to sufficiently correct depth information, and there is a possibility that the amount of overall calculation increases when the reduction ratio is a certain value or more. Furthermore, because fine structure is lost as the reduction ratio decreases and the accuracy of calculation of depth information therefore decreases, the reduction ratio is set to the extent that it is not excessively small. Specifically, the reduction ratio is more preferably set in a range from 0.01 to 0.70, and even more preferably a range from 0.05 to 0.50.

Third Embodiment

In the first embodiment, the amount of calculation for correction is reduced owing to a reduction process. In this embodiment, instead of a reduction process, the amount of calculation is reduced by reducing a data amount to be used while establishing a correspondence relationship between captured image data, depth map data, and reliability map data.

Figure 4:
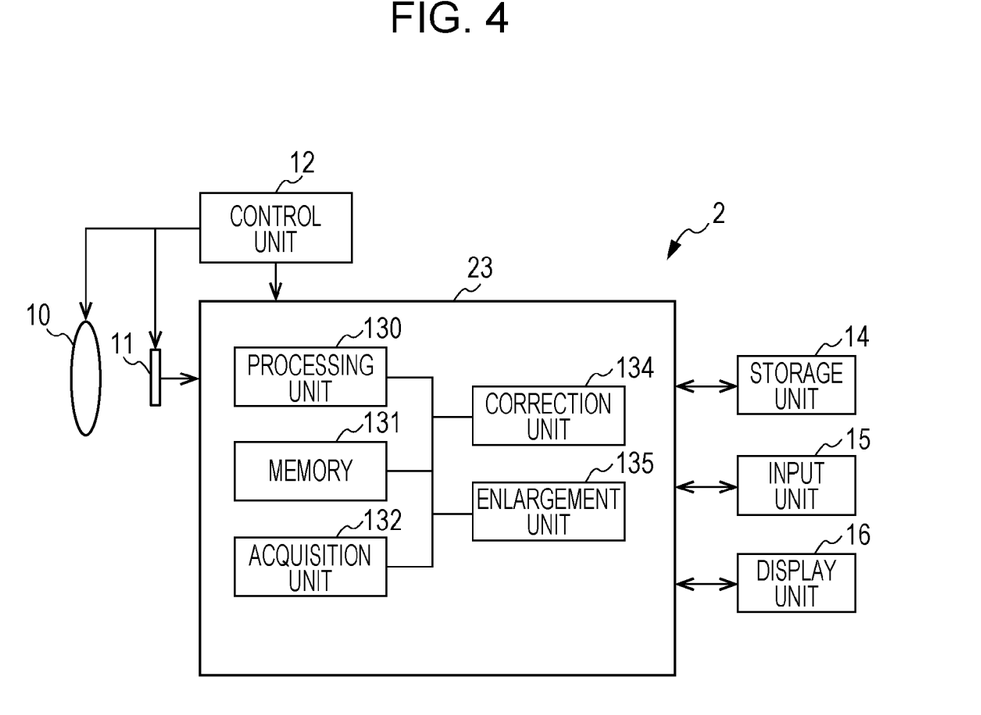
FIG. 4 is a schematic diagram illustrating an example of an image capturing apparatus including an image processing apparatus according to a third embodiment.
Figure 5:
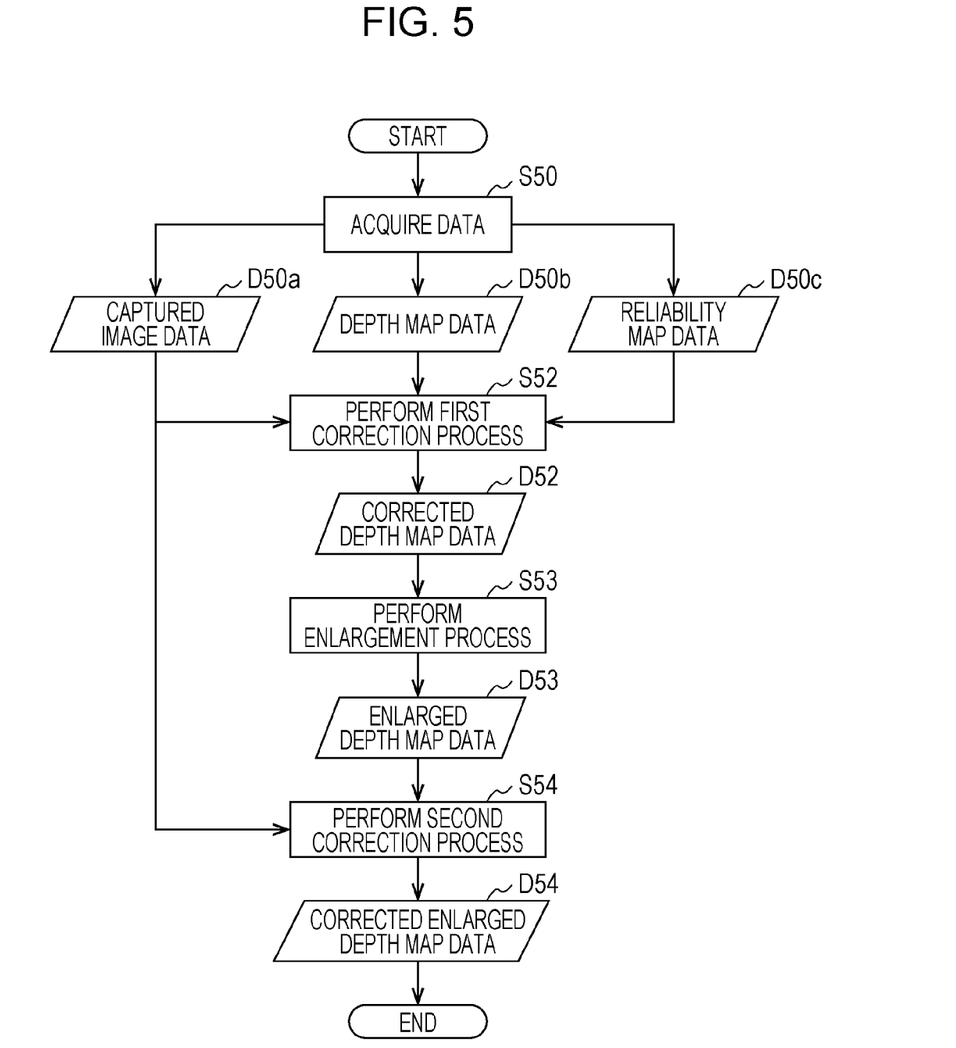
FIG. 5 illustrates an example of a flowchart of an image processing method in the third embodiment.

FIG. 4 illustrates an example of an image capturing apparatus 2 including an image processing apparatus 23 according to this embodiment. The image processing apparatus 23 differs from the image processing apparatus 13 according to the first embodiment in that it does not include the reduction unit 133. In addition, FIG. 5 illustrates an example of a flowchart of an image processing method according to this embodiment. The image processing method according to this embodiment will be described with emphasis on differences from the first embodiment with reference to FIG. 5.

First, the acquisition unit 132 acquires captured image data D50a, depth map data D50b, and reliability map data D50c (S50). As in the first embodiment, there will be described, for example, the case where a data amount of the depth map data D50b is smaller than a data amount of the captured image data D50a.

Subsequently, the correction unit 134 performs a correction process on the depth map data D50b by using the captured image data D50a and the reliability map data D50c (S52). As an example of the correction process, a filtering process using the following formula 9 is provided.

$$D'(p) = \frac{G_{\sigma_r}(|I(E(p)) - I(E(q))|)T(c(q))D(q)}{\sum_{q \in S''} G_{\sigma_s}(|p - q|)} \sum_{q \in S''} G_{\sigma_s}(|p - q|) \quad \text{formula 9}$$

$$G_{\sigma_r}(|I(E(p)) - I(E(q))|)T(c(q))$$

In the formula 9, D denotes depth information before correction, and D' denotes depth information after correction. I denotes a luminance value (color) of a pixel in the captured image data. The symbol p denotes a position of a correction target pixel in the depth map data, and q denotes a position of a surrounding pixel surrounding a correction target pixel p. G denotes a Gaussian function ($\sigma$ is a variance value), and $G_{\sigma_s}$ and $G_{\sigma_r}$ may be different Gaussian functions or the same Gaussian function. S'' denotes a calculation range, and when S'' is large, the number of surrounding pixels q's is large. The symbol c represents reliability. If the reliability of the depth information is high, T is set to 1, and if the reliability of the depth information is low, T is set to 0. Besides, as the depth information D or the luminance value I, a value corresponding to p or q is used; however, the data value of it does not necessarily have to be used, and data calculated by performing, for example, weighted averaging of the data value and surrounding data may be used.

The formula 9 is almost the same as the formula 1, and there is a difference in the way the position p of the correction target pixel and the position q of the surrounding pixel are taken. In addition, E(x) denotes a transformation function representing a pixel in the captured image data D50a corresponding to a pixel x in the depth map data D50b. That is, a luminance value I(E(x)) denotes a value of the luminance of the pixel in the captured image data D50a corresponding to the pixel x in the depth map data D50b. Note that x is p or q. There will be described in detail with reference to FIGS. 6A and 6B, for example, the case where the data amount of the depth map data D50b is smaller than the data amount of the captured image data D50a.

Figure 6A:
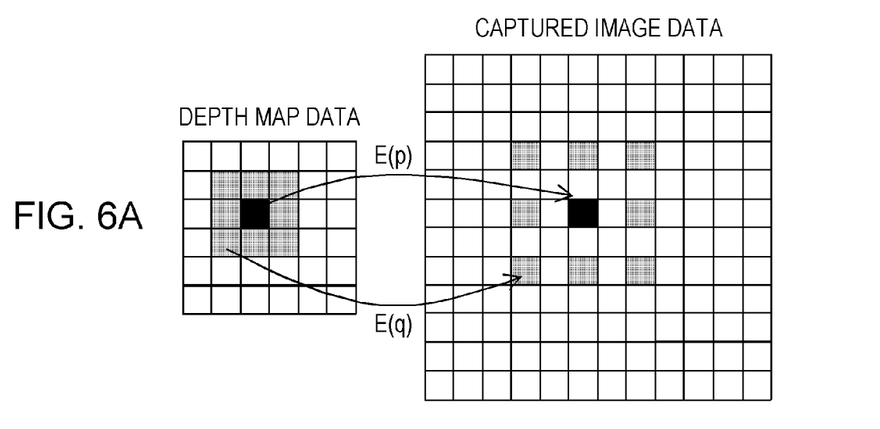
FIGS. 6A and 6B each illustrate a method for deciding upon a data selection in the third embodiment.
Figure 6B:
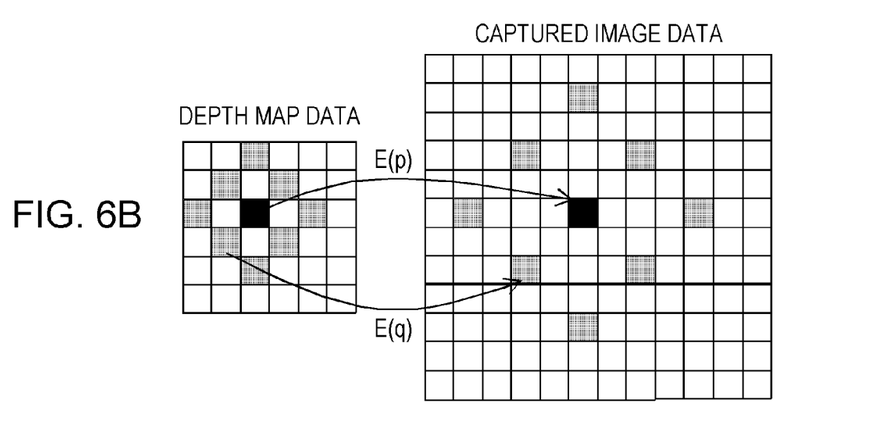

FIGS. 6A and 6B each illustrate a correspondence relationship between a correction target pixel p and a surrounding pixel q in the depth map data D50b and pixels in the captured image data D50a. FIGS. 6A and 6B each illustrate the case where the data amount of the depth map data D50b is half of the data amount of the captured image data D50a in length and width. In FIGS. 6A and 6B, both the correction target pixel p in the depth map data D50b and a pixel in the captured image data D50a corresponding to the correction target pixel p are represented in black. In addition, a plurality of surrounding pixels q's in the depth map data D50b and a plurality of pixels in the captured image data D50a corresponding one-to-one to the plurality of surrounding pixels q's are represented in gray. Besides, FIGS. 6A and 6B differ in only the range of the surrounding pixels q's. More specifically, in the case of FIG. 6B, surrounding pixels at a further distance than that in FIG. 6A are used for calculation.

As in FIGS. 6A and 6B, even if all pixels in depth map data are correction target pixels p's, pixels are selected at intervals in image data. In addition, pixels in the image data corresponding to surrounding pixels q's used for calculation of one pixel of interest are selected at intervals. That is, the total number of pixels in the image data used when the depth map data is corrected is smaller than the number of all pixels in the image data. Because of this, in this embodiment as well, the amount of data to be calculated may be reduced without reducing the image data as in the first embodiment. Besides, pixels in the depth map data and pixels in the image data do not necessarily have to be regularly associated with each other.

Furthermore, as for surrounding pixels q's, pixels close to a pixel of interest may be large in number, and pixels at a distance from the pixel of interest may be small in number. As in the first embodiment, a selection of data of p or q is decided upon in accordance with the amount of correction performed on data loss and a depth boundary portion, and the amount of calculation.

Subsequently, the enlargement unit 135 performs an enlargement process on depth map data D52 subjected to the correction process (S53), and generates enlarged depth map data D53. Finally, the correction unit 134 performs a correction process on the enlarged depth map data D53 by using the captured image data D50a, or reduced or enlarged captured image data (S54), and final depth map data D54 is generated. In the enlargement process (S53) and the correction process (S54), methods similar to those in the first embodiment may be applied.

The amount of calculation in this embodiment will be described. Assuming that B denotes the amount of data reduction owing to a selection of a pixel in the image data corresponding to a pixel of interest p in the depth map data, P' representing the first term on the right side of the formula 6 is defined by the following.

$$P' = N'^2 B^2 HV \quad \text{formula 10}$$

Assuming that B' denotes the amount of data reduction owing to a selection of a surrounding pixel q, N' representing the magnitude of the amount of correction required in the correction process in S52 is defined by the following formula 11.

$$N' = B'N \quad \text{formula 11}$$

Accordingly, considering the second term on the right side of the formula 6, when the following formula 12 is satisfied, an effect of a reduction in the amount of calculation is achieved.

$$L^2 < N^2(1-B'^2B^2)/U^2B^2 \quad \text{formula 12}$$

In comparison to the first embodiment, the method according to this embodiment enables a surrounding pixel q used for calculation to be randomly selected, and is more robust.

Fourth Embodiment

The above-mentioned image processing methods according to the present invention may be desirably applied to, for example, an image capturing apparatus, such as a digital camera or camcorder, or an image processing apparatus or computer that performs image processing on image data captured by an image capturing apparatus. Furthermore, the techniques according to the present invention may be applied to various electronic devices (among which are a mobile phone, a smartphone, a slate device, and a personal computer) equipped with such an image capturing apparatus or image processing apparatus. In the above-mentioned embodiments, the configuration in which the functions of the image processing apparatus are installed in a main body of the image capturing apparatus is described; however, the functions of the image processing apparatus may be configured in any manner. For example, the image processing apparatus is installed in a computer including the image capturing apparatus, the computer acquires an image captured by the image capturing apparatus, and the foregoing image processing methods may be executed on the basis of the image. In addition, the image processing apparatus is installed in a computer capable of accessing a network by wire or wirelessly, the computer acquires a plurality of images via the network, and the foregoing image processing methods may be executed on the basis of the images. Acquired depth information may be used for various image processing operations, such as area division of an image, generation of a stereoscopic image or image with a sense of depth, and emulation of a blur effect.

A specific implementation performed on the foregoing apparatus may be either an implementation via software (program) or an implementation via hardware. For example, a program is stored in a memory of a computer (microcontroller, field programmable gate array (FPGA), or the like) installed in the image capturing apparatus or the like, and various processes for achieving a purpose of the present invention may be implemented by causing the computer to execute that program. Furthermore, it is also desirable to install a dedicated processor, such as an application specific integrated circuit (ASIC), that implements all or some of the processes according to the present invention by using a logic circuit.

An image processing apparatus is implemented as one function of an image processing apparatus (image processing engine) installed in an image capturing apparatus, such as a digital camera, digital camcorder, or surveillance camera, and is used for various image processing operations (clipping of an object, blurring of a background, application of a blur effect, and the like) performed on a captured image.

According to the present invention, depth information may be accurately corrected with a small amount of calculation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-224443 filed Oct. 29, 2013, which is hereby incorporated by reference herein in its entirety.

What is claimed is:

1. An image processing apparatus comprising:
   at least one memory storing a program of instructions; and
   at least one processor configured to execute the program of instructions to implement:
      an acquisition unit configured to acquire captured image data and depth map data representing a distribution of depth information of an object acquired from the captured image data;
      a reduction unit configured to reduce the captured image data acquired by the acquisition unit in accordance with a data amount of the depth map data;
      a correction unit configured to correct the depth map data by using the reduced captured image data; and
      an enlargement unit configured to enlarge the corrected depth map data,
   wherein each piece of depth information included in the depth map data corresponds to any one of a plurality of signal levels included in the reduced captured image data, and
   wherein the correction unit corrects depth information before correction, the depth information before correction being a part of the depth map data, by using different depth information included in the depth map data, and
   wherein a signal level of the reduced captured image data corresponding to the depth information before correction and a signal level of the reduced captured image data corresponding to the different depth information satisfy predetermined conditions, and
   wherein a following formula is satisfied:

$$L^2 < N^2(1-C^4)/U^2C^2,$$

where N is a data amount required for correction, C is a reduction ratio used for reduction of the captured image data performed by the reduction unit, U is an enlargement ratio used for enlargement of the depth map data performed by the enlargement unit, and L is a size of a filter used for correction of the enlarged depth map data performed by the correction unit.

2. The image processing apparatus according to claim 1, wherein the reduction unit is configured to reduce the captured image data acquired by the acquisition unit such that a data amount of the reduced captured image data coincides with the data amount of the depth map data.

3. The image processing apparatus according to claim 1, wherein the correction unit is configured to correct the depth map data by using reliability map data representing a distribution of reliability of the depth information.

4. The image processing apparatus according to claim 1, wherein the enlargement unit is configured to enlarge the corrected depth map data such that a data amount of the enlarged depth map data coincides with a data amount of the captured image data acquired by the acquisition unit.

5. The image processing apparatus according to claim 1, wherein the correction unit is configured to correct the enlarged depth map data by using the captured image data acquired by the acquisition unit.

6. An image capturing apparatus comprising:
   the image processing apparatus according to claim 1; and
   an image sensor, wherein the acquisition unit is configured to acquire captured image data from a signal output from the image sensor.

7. The image processing apparatus according to claim 1, wherein
a difference between the signal level of the reduced captured image data corresponding to the depth information before correction and the signal level of the reduced captured image data corresponding to the different depth information is equal to or less than a threshold value.

8. The image processing apparatus according to claim 7, wherein
the acquisition unit acquires reliability of the depth information, and
the reliability of the different depth information is higher than a predetermined value.

9. An image processing apparatus comprising:
at least one memory storing a program of instructions; and
at least one processor configured to execute the program of instructions to:
acquire captured image data and depth map data representing a distribution of depth information of an object acquired from the captured image data;
reduce the captured image data so acquired in accordance with a data amount of the depth map data;
correct the depth map data by using the reduced captured image data; and
enlarge the corrected depth map data,
wherein each piece of depth information included in the depth map data corresponds to any one of a plurality of signal levels included in the reduced captured image data, and
wherein the circuitry corrects depth information before correction, the depth information before correction being a part of the depth map data, by using different depth information included in the depth map data, and
wherein a signal level of the reduced captured image data corresponding to the depth information before correction and a signal level of the reduced captured image data corresponding to the different depth information satisfy predetermined conditions, and
wherein a following formula is satisfied:

$$L^2 < N^2(1-C^4)/U^2C^2,$$

where N is a data amount required for correction, C is a reduction ratio used to reduce the captured image data, U is an enlargement ratio used to enlarge the depth map data, and L is a size of a filter used to correct the enlarged depth map data.

10. An image processing method, the image processing method performed in an operating environment that includes at least one memory storing a program of instructions and that includes at least one processor configured to execute the program of instructions to perform steps of the method, the image processing method comprising:
acquiring captured image data and depth map data representing a distribution of depth information of an object acquired from the captured image data;
reducing the captured image data acquired by the acquiring in accordance with a data amount of the depth map data; and
correcting the depth map data by using the reduced captured image data; and
enlarging the corrected depth map data,
wherein each piece of depth information included in the depth map data corresponds to any one of a plurality of signal levels included in the reduced captured image data, and
wherein the correcting corrects depth information before correction, the depth information before correction being a part of the depth map data, by using different depth information included in the depth map data, and
wherein a signal level of the reduced captured image data corresponding to the depth information before correction and a signal level of the reduced captured image data corresponding to the different depth information satisfy predetermined conditions, and
wherein a following formula is satisfied:

$$L^2 < N^2(1-C^4)/U^2C^2,$$

where N is a data amount required for correction, C is a reduction ratio used for reduction of the captured image data by the reducing, U is an enlargement ratio used for enlargement of the depth map data by the enlarging, and L is a size of a filter used for correction of the enlarged depth map data by the correcting.

* * * * *